United States Patent
Hartman

(10) Patent No.: US 11,038,324 B2
(45) Date of Patent: Jun. 15, 2021

(54) LADDER RACK WITH INTEGRAL CABLE CLEAT

(71) Applicant: Panduit Corp., Tinley Park, IL (US)

(72) Inventor: Scott R. Hartman, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 19 days.

(21) Appl. No.: 16/459,909

(22) Filed: Jul. 2, 2019

(65) Prior Publication Data

US 2020/0028337 A1  Jan. 23, 2020

Related U.S. Application Data

(60) Provisional application No. 62/700,402, filed on Jul. 19, 2018.

(51) Int. Cl.
| | |
|---|---|
| *F16L 3/22* | (2006.01) |
| *H02G 3/04* | (2006.01) |
| *F16L 3/223* | (2006.01) |
| *F16L 3/10* | (2006.01) |

(52) U.S. Cl.
CPC .......... *H02G 3/0456* (2013.01); *F16L 3/1075* (2013.01); *F16L 3/2235* (2013.01)

(58) Field of Classification Search
CPC ......... H02G 3/0456; F16L 3/26; F16B 7/0473
See application file for complete search history.

(56) References Cited

U.S. PATENT DOCUMENTS

| | | | | |
|---|---|---|---|---|
| 3,537,150 A | * | 11/1970 | Emberson | F16B 12/50 403/344 |
| 4,349,220 A | * | 9/1982 | Carroll | H02G 3/0608 138/155 |
| 4,432,519 A | | 2/1984 | Wright | |
| 5,165,453 A | * | 11/1992 | Walker, Jr. | F16L 3/26 138/100 |
| 5,535,969 A | | 7/1996 | Duffy | |
| 5,580,014 A | | 12/1996 | Rinderer | |
| 5,992,802 A | | 11/1999 | Campbell | |
| 6,019,322 A | | 2/2000 | Shimizu | |
| 6,343,771 B1 | | 2/2002 | Simon | |
| 7,316,390 B2 | | 1/2008 | Burlison | |
| 8,136,769 B2 | * | 3/2012 | Cardin | F16L 3/26 248/49 |
| 8,294,030 B2 | * | 10/2012 | Pollard, Jr. | H02G 3/24 174/155 |

(Continued)

FOREIGN PATENT DOCUMENTS

| | | |
|---|---|---|
| EP | 1641097 A1 | 3/2006 |
| EP | 2944854 A1 | 11/2015 |

(Continued)

*Primary Examiner* — Amy J. Sterling
(74) *Attorney, Agent, or Firm* — Christopher S. Clancy; James H. Williams; Aimee E. McVady

(57) ABSTRACT

A cable management assembly designed to maintain cables during a short circuit event. The cable management assembly includes a ladder rack having a first side, a second side, and a plurality of ladder rungs extending from the first side to the second side. The plurality of ladder rungs include receptacles to receive the cables. Each side of the ladder rack has a plurality of holes extending a length of the ladder rack. A clamping frame is positioned over and secured to the ladder rack thereby maintaining the cables positioned in the ladder rungs.

11 Claims, 7 Drawing Sheets

(56) References Cited

U.S. PATENT DOCUMENTS

| | | |
|---|---|---|
| 8,558,112 B2 | 10/2013 | Pawluk |
| 8,783,629 B2 | 7/2014 | Even et al. |
| 9,059,575 B2 | 6/2015 | Pawluk |
| 9,362,727 B2 | 6/2016 | Cardin et al. |
| 9,478,964 B2 | 10/2016 | Carlson et al. |
| 9,583,922 B2 | 2/2017 | Pawluk |
| 9,810,021 B2 | 11/2017 | Sylvester et al. |
| 10,601,208 B2 * | 3/2020 | Hopkinson .......... H02G 3/0406 |
| 2009/0218451 A1 | 9/2009 | Lundborg |
| 2009/0260846 A1 | 10/2009 | Henry |
| 2010/0019106 A1 | 1/2010 | Sisley |
| 2012/0028511 A1 | 2/2012 | Even et al. |
| 2017/0149228 A1 | 5/2017 | Pawluk |
| 2017/0279256 A1 | 9/2017 | Mostazo Oviedo |

FOREIGN PATENT DOCUMENTS

| | | |
|---|---|---|
| GB | 2265764 A | 6/1993 |
| WO | 2017074640 A1 | 5/2017 |

\* cited by examiner

LADDER RACK WITH INTEGRAL CABLE CLEAT

CROSS REFERENCE TO RELATED APPLICATIONS

This application claims priority to U.S. Provisional Application No. 62/700,402, filed Jul. 19, 2018, the subject matter of which is hereby incorporated by reference in its entirety.

FIELD OF THE INVENTION

The present invention relates to cable cleats, and more particularly to a ladder rack with an integral cable cleat.

BACKGROUND OF THE INVENTION

In industrial environments high power applications utilize 3-phase power due to its efficiency over single phase power. Often the three conductors of a 3-phase system are contained within a single jacketed cable, however, as power requirements increase, and the size of cables increases, three separate single conductor cables are often used in a trefoil arrangement. These cables are heavy and need to be supported periodically along their length to avoid damage.

Cable cleats or cleat assemblies are typically used to manage and secure the 3-phase power cables in a trefoil arrangement along a ladder rung of a ladder rack pathway. In addition to securing the cables laterally and axially, cable cleats must be rigid enough to retain cables during short-circuit events, where electromagnetic forces can cause the cables to repel one another at extremely high forces. Thus, the cable cleats are designed to hold the cables in place during a short-circuit event to prevent damage to people and property.

Typically, ladder rack pathways are constructed to extend from the power source to the load. The ladder rack pathways are typically elevated and may consist of multiple layers depending on the power requirements. The cable installed on the ladder rack comes on large spools and is heavy and stiff. Typically, the cabling is pulled on the ladder rack, one cable at a time. There are multiple trefoil groupings per ladder rack. The unspooling and pulling of cables is repeated multiple times. If the cables are not separated in trefoils as they are pulled, the cables can get mixed up as they are laid on the ladder rack. As a result, installers pull 3 cables and then install cable cleats for that trefoil arrangement to keep the 3-phase cables together.

Cable cleats are secured to the ladder rung using a bolt and nut inserted through the cable cleat and the ladder rung. However, there are many different types and sizes of ladder rungs and not all ladder rungs have slots for attachment. Therefore, other attachment means are often required. In addition, during installation, some cable cleats must be installed onto the ladder rung before cable can be placed on the ladder rack or moved into a position out of the way of the cable cleats since access to the mounting bolt is required for installation. Unfortunately, the preinstalled cable cleats can interfere with the pulling of cables.

Therefore, there is a need for an improved cable management assembly that can be used to facilitate the installation of 3-phase power cables. There is also a need for an improved cable management assembly that manages and secures 3-phase power cables in a trefoil arrangement.

SUMMARY OF THE INVENTION

The present invention is directed to a cable management assembly that maintains cables during a short circuit event. The cable management assembly includes a ladder rack and a clamping frame secured to the ladder rack. The ladder rack has a first side, a second side, and a plurality of ladder rungs extending from the first side to the second side. The top of the first side and the top of the second side have a plurality of holes that extend the length of the first and second sides. The plurality of ladder rungs have at least one receptacle that receive at least one cable. The clamping frame is positioned over the ladder rack, the ladder rungs, and the at least one cable to secure the at least one cable.

DETAILED DESCRIPTION

The present invention is designed to support and protect three single conductor power cables in a trefoil configuration along a ladder rack pathway. The invention simplifies installation of the cables and reduces the costs of the overall system. The present invention enables an installer to pull cabling directly into the trefoil arrangement and then lock down the cables, so the cables are secured on the ladder rack pathway. The present invention eliminates the use of cable cleats as separate components by incorporating a cable cleat into the ladder rack pathway.

Figure 1:
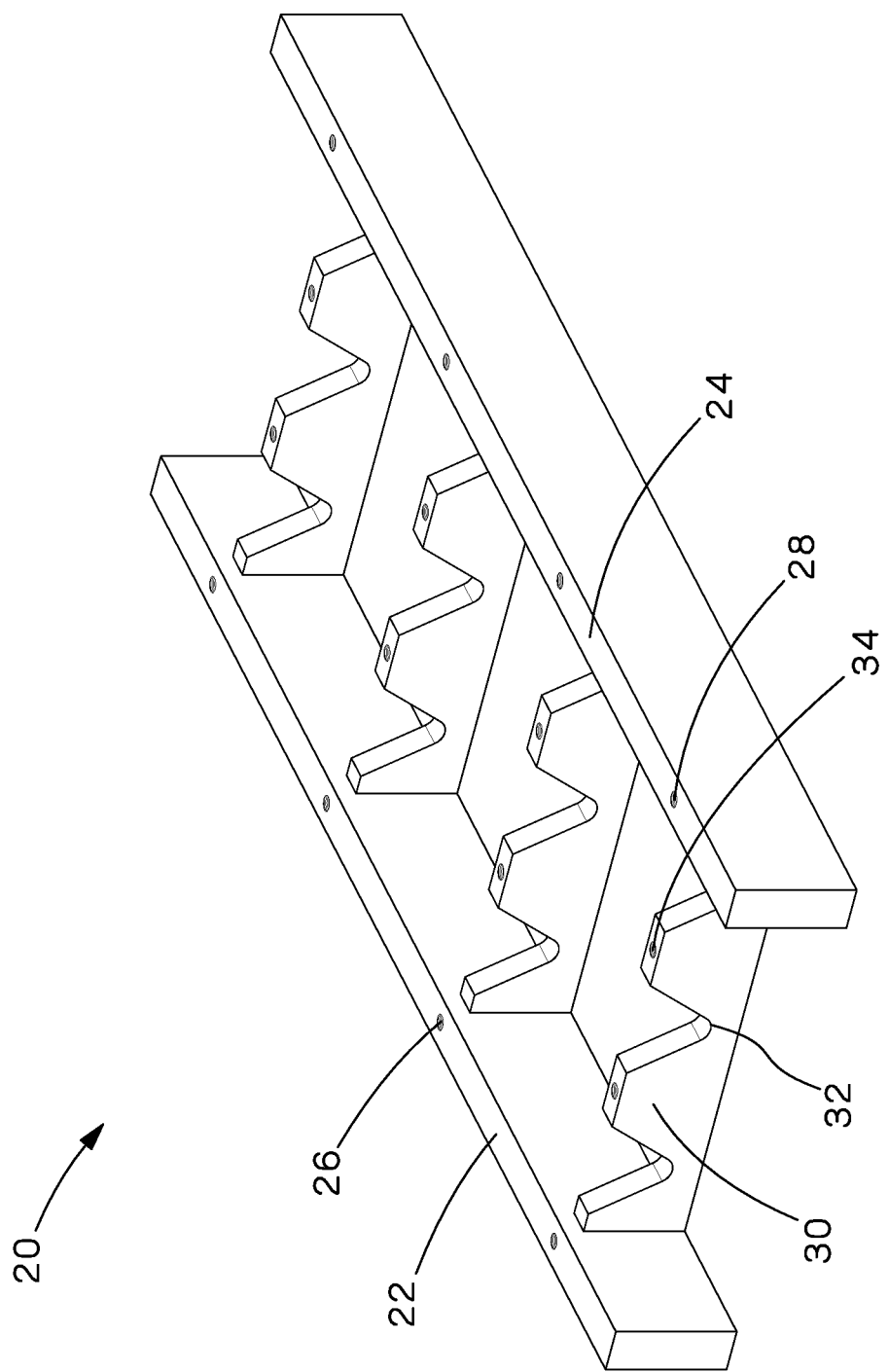
FIG. 1 is a perspective view of a ladder rack of the present invention.
Figure 2:
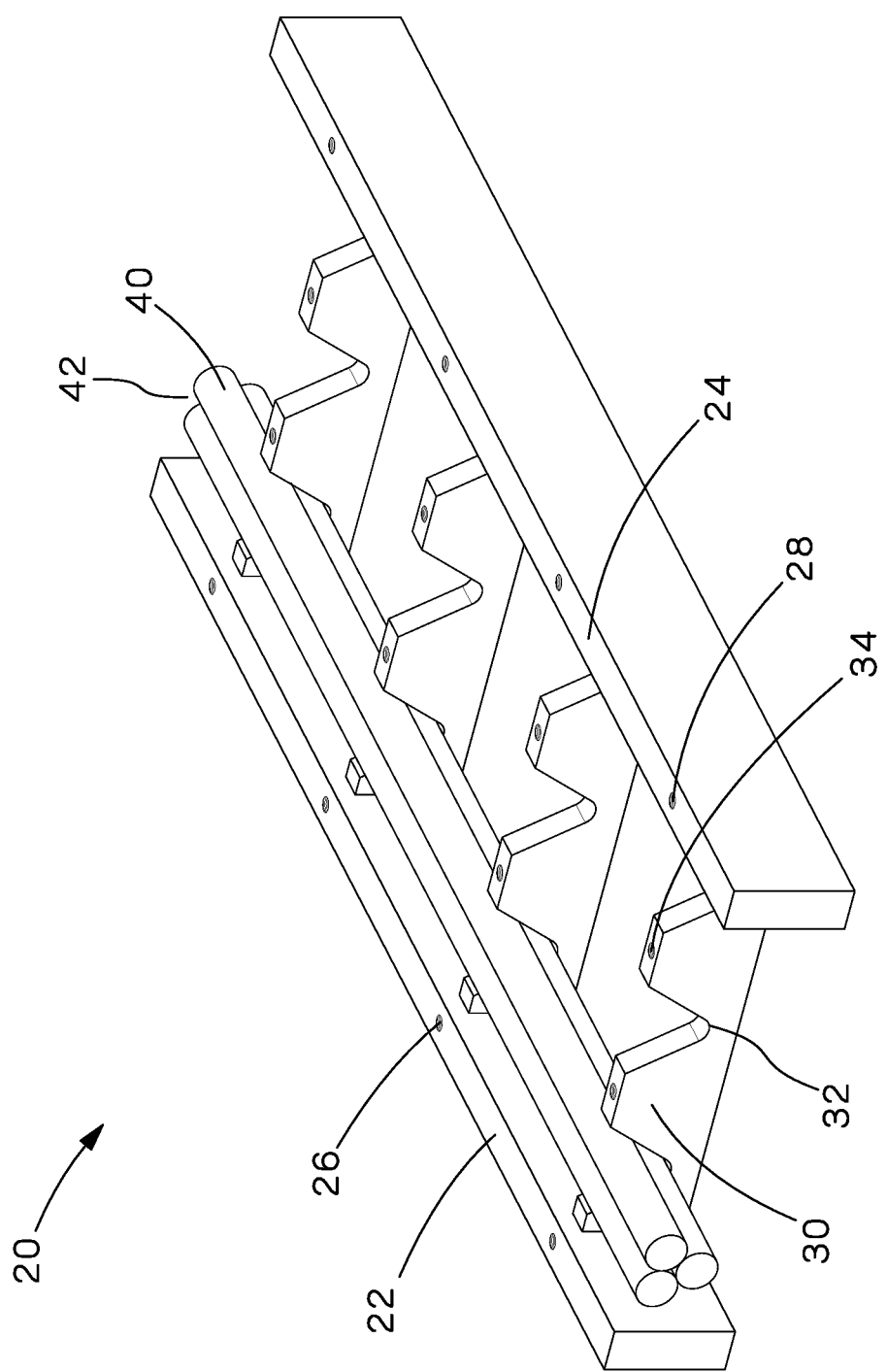
FIG. 2 is a perspective view of the ladder rack of FIG. 1 with a trefoil cable arrangement positioned on the ladder rungs.

FIGS. 1 and 2 illustrate a section of ladder rack 20 of the present invention. Each ladder rung 30 includes V-shaped receptacles 32 incorporated in the ladder rung 30 to create a receptacle for the cables 40 as they are laid into the ladder rack 20. FIG. 1 illustrates each ladder rung 30 with three V-shaped receptacles 32, however, the ladder rungs 30 may include any number of V-shaped receptacles 32 depending on the width of the ladder rack 20.

Figure 3:
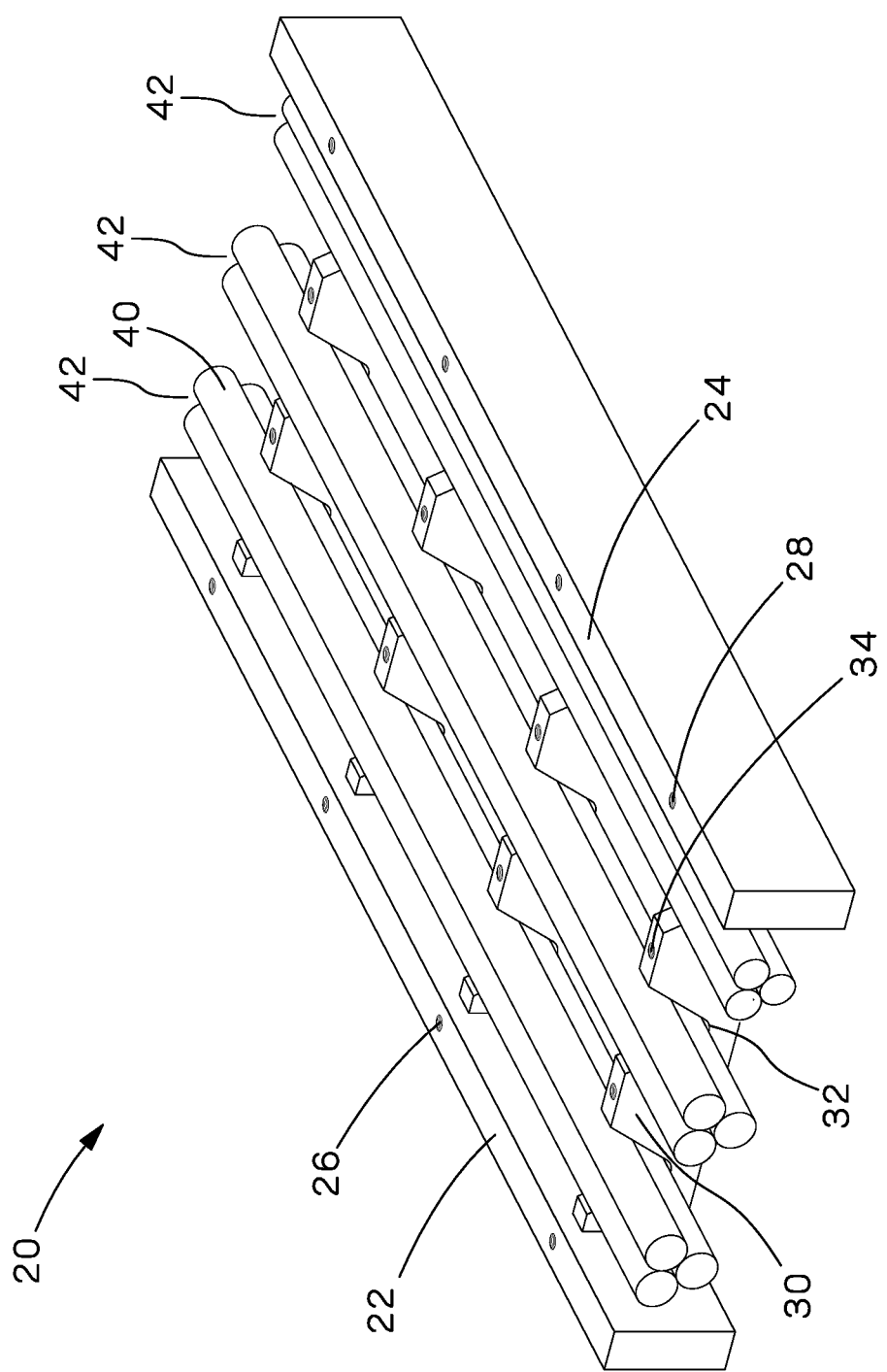
FIG. 3 is a perspective view of the ladder rack of FIG. 2 with a plurality of trefoil cable arrangements positioned on the ladder rungs.

As illustrated in FIGS. 2 and 3, the V-shaped receptacles 32 in the ladder rungs 30 allow the installer to run all cabling 40, instead of one set of three cables at a time, without any interruption to cleat each trefoil arrangement.

Figure 4:
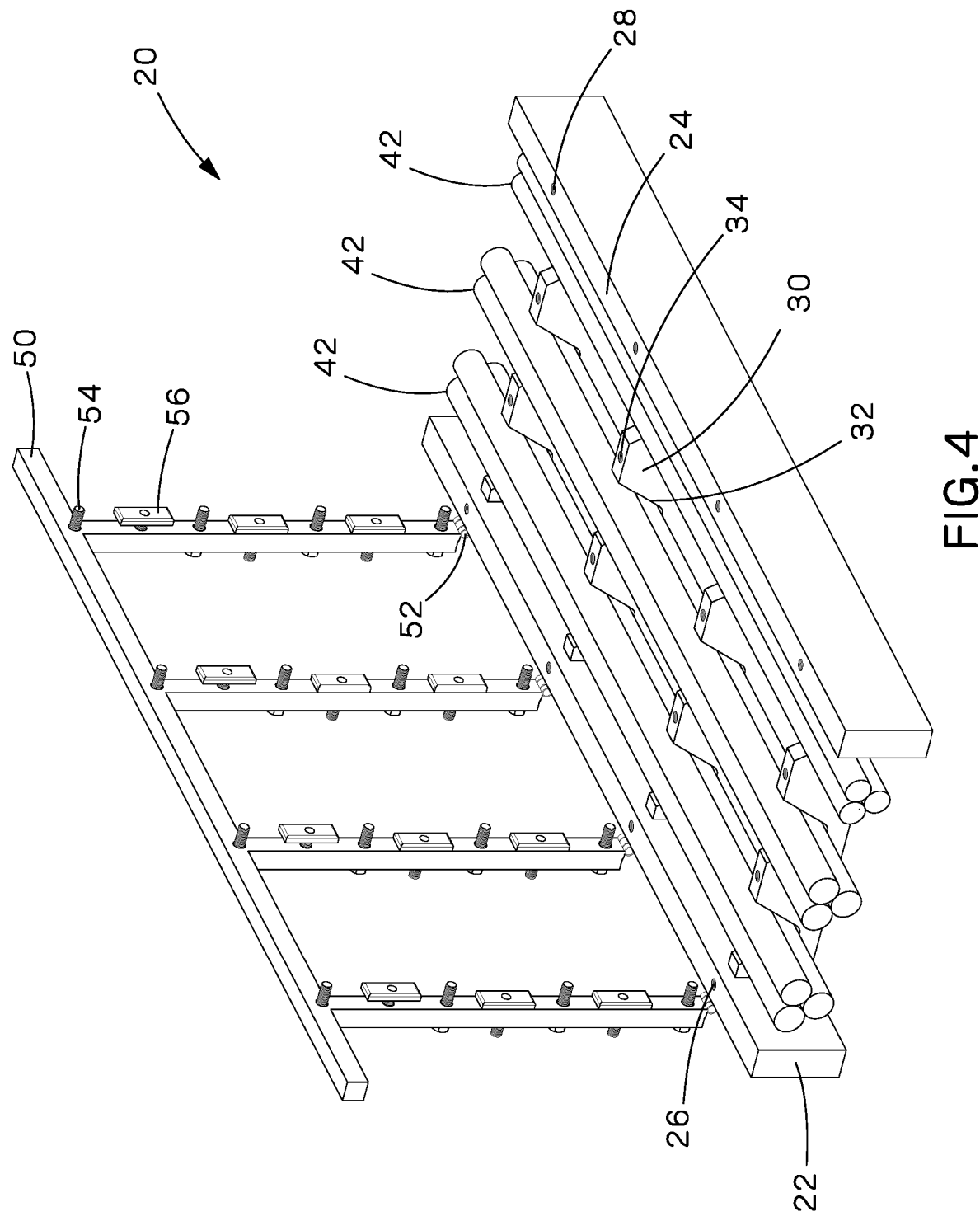
FIG. 4 is a perspective view of the ladder rack of FIG. 3 with a clamping frame positioned in an open position.
Figure 5:
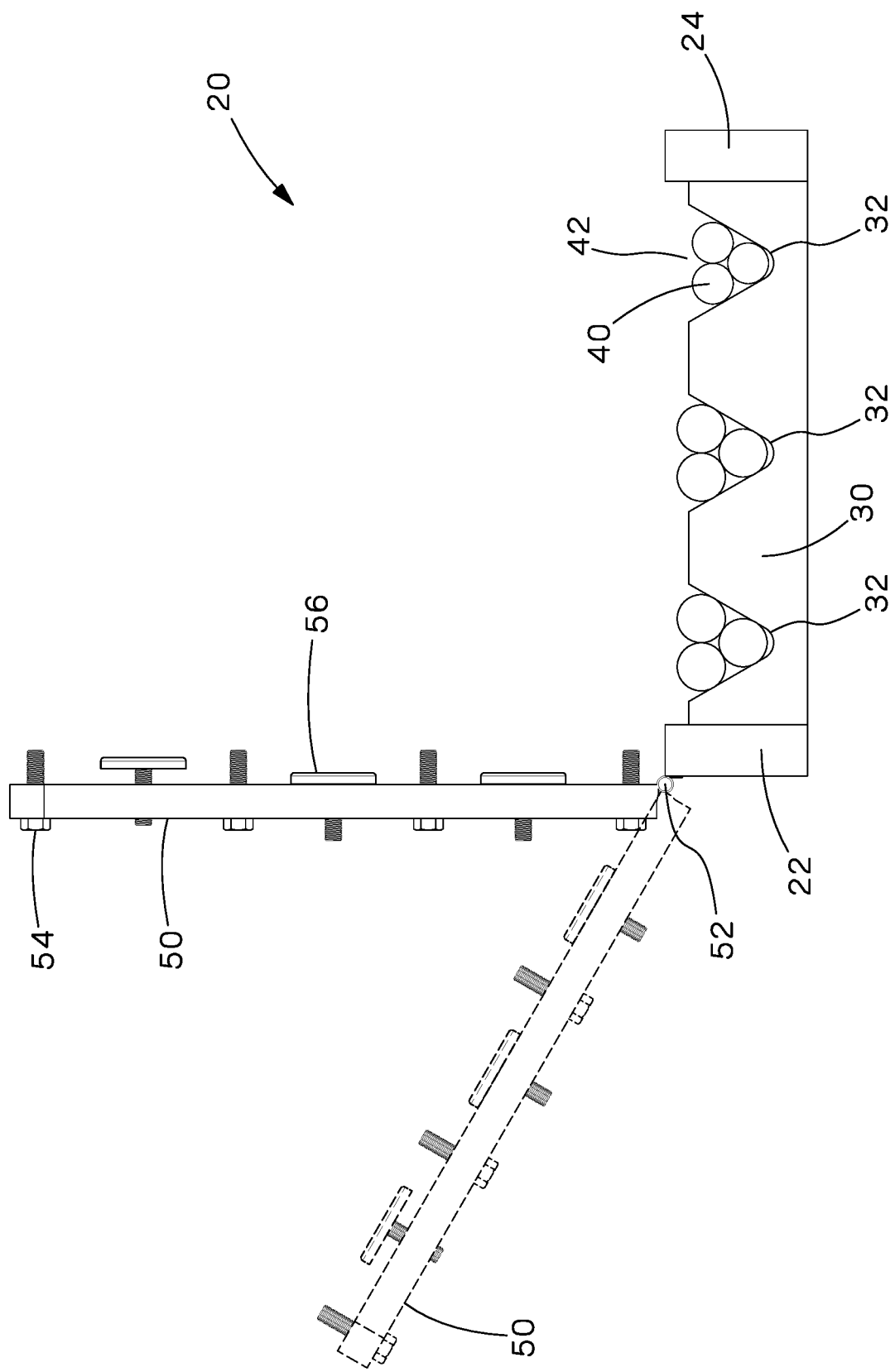
FIG. 5 is a front view of the ladder rack and clamping frame of FIG. 4 with a rotated clamping frame represented in dashed lines.

Once all of the cables 40 are in place and organized efficiently, the cables 40 may be retained by a clamping frame 50. The clamping frame 50 is designed to extend the length of each ladder rack segment. FIGS. 4-5 illustrate the clamping frame 50 pivotally attached to one side 22 of the ladder rack 20 by a hinge 52. The clamping frame 50 is designed to be quickly closed and fastened to the ladder rungs 30 and the opposite side 24 of the ladder rack 20. The clamping frame 50 includes multiple threaded fasteners 54 to enable the clamping frame 50 to be locked down to the ladder rung 30 and ladder rack 20. The fasteners 54 are received in the holes 26, 28 in the sides 22, 24, respectively, of the ladder rack and the holes 34 across the ladder rung 30.

It is contemplated that various fastening means, other than threaded fasteners, may be used to secure the clamping frame. For example, the clamping frame may be secured to the ladder rack and ladder rung by quarter turn fasteners, cam-locks, or slide fasteners.

As illustrated in FIG. 5, the clamping frame 50, represented in dashed lines, may be rotated to an open position greater than 90 degrees with respect to the ladder rack pathway. An extended open position may be desirable when installing larger diameter cables in the ladder rack pathway. Thus, the clamping frame 50 may be rotated to a position that facilitates the placement of the cables 40 in the ladder rack pathway.

Figure 6:
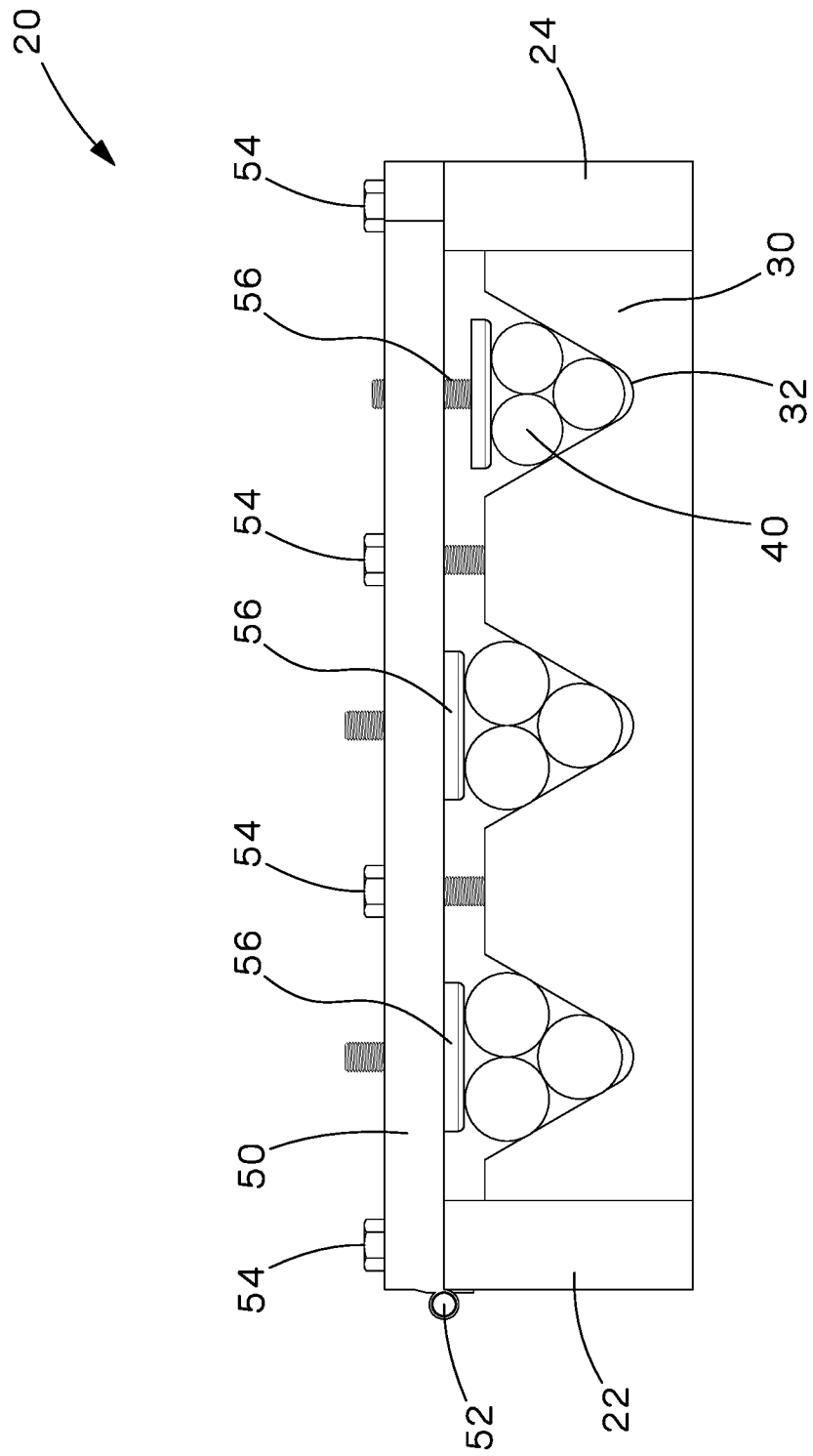
FIG. 6 is a front view of the ladder rack and clamping frame of FIG. 4 with the clamping frame in a closed position.

FIG. 6 illustrates the clamping frame 50 in the closed position over the ladder rungs 30 and trefoil cable arrangements 42. As illustrated, the range of the cable diameters installed in the ladder rungs 30 can vary. The clamping frame 50 is designed to accommodate a range of cable diameters. A plurality of adjustment clamps 56 are secured to the clamping frame 50 at spaced intervals. The adjustment clamps 56 are spaced to be positioned over each V-shaped receptacle 32. When the diameter of the trefoil arrangement 42 is small, the adjustment clamp 56 is adjusted to engage the trefoil cable arrangement 42 positioned in the V-shaped receptacle 32 (see FIG. 6).

Figure 7:
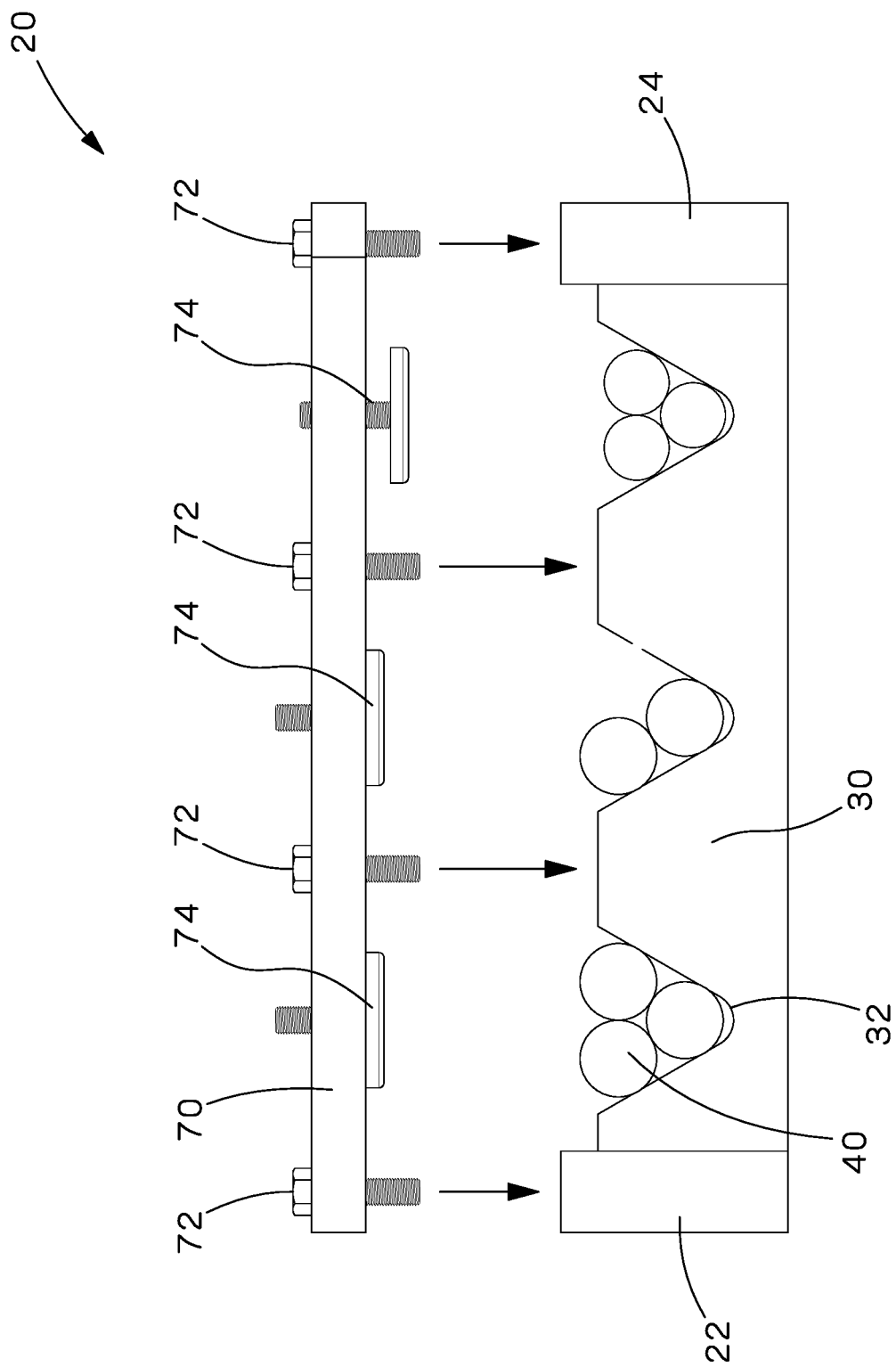
FIG. 7 is a front view of the ladder rack of FIG. 3 with an alternative clamping frame.

FIG. 7 illustrates an alternate clamping device that includes an individual clamping beam 70 for each ladder rung 30. The clamping beam 70 includes a plurality of threaded fasteners 72 and adjustment clamps 74. The threaded fasteners 72 are installed in holes 26, 28 each side 22, 24, respectively, of the ladder rack 20. The threaded fasteners 72 are also installed in the holes 34 in the ladder rung 30.

It is contemplated that various alternative embodiments could be used with the V-shaped receptacle ladder rungs. For example, an individual clamping frame could be secured to each trefoil arrangement on the ladder rungs. Alternatively, the clamping frame could include V-shaped receptacles to be installed over trefoil cable arrangements positioned on standard ladder rungs. The clamping frame could engage features on the sides of the ladder rack to lock down the trefoil cable arrangements. All surfaces that come in contact with the power cables can have a separate molded plastic component to protect the jacket of the cables from damage and to enhance the pulling of the cables. Procedures can be developed for tightening or loosing certain clamping frames or clamping beams along the ladder rack to help mitigate or manage thermal expansion effects.

Thus, the clamping frame of the present invention enables the trefoil cables to be quickly and efficiently installed on a ladder rack pathway.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable management assembly for maintaining cables during a short circuit event, the cable management assembly comprising:
    a ladder rack having a first side, a second side, and a plurality of ladder rungs extending from the first side to the second side; wherein a top of the first side and a top of the second side having a plurality of holes extending a length of the first side and a length of the second side;
    wherein the plurality of ladder rungs have a plurality of receptacles; the plurality of receptacles are aligned with the receptacles in adjacent ladder rungs to form a pathway for the cables;
    a clamping frame secured to the ladder rack; wherein the clamping frame is positioned over the ladder rack, the ladder rungs, and the cables to secure the cables; and
    wherein the clamping frame further comprising adjustment clamps for securing cables of varying diameter in the receptacles in the ladder rungs, whereby the adjustment clamps are adjusted to engage cables positioned in the receptacles in the ladder rung.

2. The cable management assembly of claim 1, wherein the clamping frame is pivotally secured to one side of the ladder rack.

3. The cable management assembly of claim 2, wherein the clamping frame rotates to an open position beyond 90 degrees with respect to the ladder rack.

4. The cable management assembly of claim 1, wherein the clamping frame is secured to the first side of the ladder rack and the second side of the ladder rack by fasteners.

5. The cable management assembly of claim 1, wherein the clamping frame accommodates a range of cable diameters.

6. The cable management assembly of claim 1, wherein the clamping frame includes a plurality of threaded fasteners extending therefrom, whereby the threaded fasteners are positioned to be inserted in the plurality of holes in the first side and the plurality of holes in the second side when the clamping frame is positioned over the ladder rack.

7. The cable management assembly of claim 1, wherein the receptacles extend a height of the ladder rung.

8. The cable management assembly of claim 1, wherein the receptacles are V-shaped; the V-shaped receptacles support a trefoil configuration of cables.

9. A cable management assembly for maintaining cables during a short circuit event, the cable management assembly comprising:
    a ladder rack having a first side, a second side, and a plurality of ladder rungs extending from the first side to the second side; wherein a top of the first side and a top of the second side having a plurality of holes extending a length of the first side and a length of the second side;
    wherein a top of the ladder rungs having a plurality of holes, wherein the holes in each ladder rung are aligned with one of the holes in the first side of the ladder rack and one of the holes in the second side of the ladder rack;
    wherein the plurality of ladder rungs having at least one receptacle for receiving at least one cable; and
    a clamping frame secured to the ladder rack; wherein the clamping frame is positioned over the ladder rack, the ladder rungs, and the at least one cable to secure the at least one cable.

10. The cable management assembly of claim 9, wherein the clamping frame includes a plurality of threaded fasteners extending therefrom, whereby the threaded fasteners are positioned to be inserted in the plurality of holes in the first side, the plurality of holes in the ladder rung, and the plurality of holes in the second side when the clamping frame is positioned over the ladder rack.

11. A cable management assembly for maintaining cables during a short circuit event, the cable management assembly comprising:

a ladder rack having a first side, a second side, and a plurality of ladder rungs extending from the first side to the second side; wherein a top of the first side and a top of the second side having a plurality of holes extending a length of the first side and a length of the second side;

wherein the plurality of ladder rungs having at least one receptacle for receiving at least one cable;

a clamping frame secured to the ladder rack; wherein the clamping frame is positioned over the ladder rack, the ladder rungs, and the at least one cable to secure the at least one cable; and wherein the clamping frame further comprising adjustment clamps for securing cables of varying diameter in the ladder rungs, whereby the adjustment clamps are adjusted to engage the at least one cable positioned in the receptacle of the ladder rung.

* * * * *